(12) United States Patent
DeNero et al.

(10) Patent No.: US 9,311,293 B2
(45) Date of Patent: Apr. 12, 2016

(54) TECHNIQUES FOR GENERATING TRANSLATION CLUSTERS

(75) Inventors: John DeNero, San Francisco, CA (US); Mohit Bansal, Berkeley, CA (US)

(73) Assignee: Google Inc., Mountain View, CA (US)

( * ) Notice: Subject to any disclaimer, the term of this patent is extended or adjusted under 35 U.S.C. 154(b) by 793 days.

(21) Appl. No.: 13/600,301

(22) Filed: Aug. 31, 2012

(65) Prior Publication Data
US 2013/0275118 A1  Oct. 17, 2013

Related U.S. Application Data

(60) Provisional application No. 61/623,743, filed on Apr. 13, 2012.

(51) Int. Cl.
*G06F 17/28* (2006.01)
*G06F 17/27* (2006.01)

(52) U.S. Cl.
CPC ........ *G06F 17/2785* (2013.01); *G06F 17/2827* (2013.01)

(58) Field of Classification Search
CPC ............... G06F 17/30669; G06F 17/30598; G06F 17/2795
USPC ........................................................ 704/3, 9
See application file for complete search history.

(56) References Cited

U.S. PATENT DOCUMENTS

| | | | |
|---|---|---|---|
| 8,983,142 B1* | 3/2015 | Zhang et al. | 382/111 |
| 2008/0215309 A1* | 9/2008 | Weischedel | G06F 17/2229 704/3 |
| 2009/0259633 A1* | 10/2009 | Bronstein et al. | 707/3 |
| 2011/0202334 A1* | 8/2011 | Abir | 704/4 |

* cited by examiner

*Primary Examiner* — Jakieda Jackson
(74) *Attorney, Agent, or Firm* — Remarck Law Group PLC

(57) ABSTRACT

A computer-implemented technique can include receiving, at a server including one or more processors, a source word in a source language. The technique can include determining, at the server, one or more potential translations for the source word in a target language different than the source language. The technique can include determining, at the server, one or more synonyms for each of the one or more potential translations to obtain a plurality of potential translations. The technique can include determining, at the server, one or more translation clusters using the plurality of potential translations and a clustering algorithm. Each translation cluster can contain all of the plurality of potential translations that have a similar denotation and each of the plurality of translations that have a similar denotation can be included in a specific translation cluster. The technique can also include outputting, at the server, the one or more translation clusters.

18 Claims, 3 Drawing Sheets

"TECHNIQUES FOR GENERATING TRANSLATION CLUSTERS

CROSS-REFERENCE TO RELATED APPLICATIONS

This application claims the benefit of U.S. Provisional Application No. 61/623,743, filed on Apr. 13, 2012. The entire disclosure of the above application is incorporated herein by reference.

FIELD

The present disclosure relates to language translation and, more particularly, to techniques for generating translation clusters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A bilingual lexicon can generally refer to a vocabulary, e.g., a set of words, in two different languages. Specifically, the bilingual lexicon can relate a word in a first language to one or more words in the second language. One type of bilingual lexicon is a bilingual dictionary. A bilingual dictionary can provide meanings or definitions of words in one (a unidirectional bilingual dictionary) or both (a bidirectional bilingual dictionary) of the first and second languages. Bilingual dictionaries, therefore, can also be referred to as translation dictionaries. In the case of a unidirectional bilingual dictionary, one of the languages may be a source language (spoken/understood by a reader) and the other language may be a target language. For example only, a bilingual dictionary may be a Spanish-English dictionary or a Japanese-English dictionary.

SUMMARY

A computer-implemented technique is presented. The technique can include receiving, at a server including one or more processors, a source word in a source language. The technique can include determining, at the server, one or more potential translations for the source word in a target language different than the source language. The technique can include determining, at the server, one or more synonyms for each of the one or more potential translations to obtain a plurality of potential translations. The technique can include determining, at the server, one or more translation clusters using the plurality of potential translations and a first clustering algorithm. Each translation cluster can contain all of the plurality of potential translations that have a similar denotation and each of the plurality of translations that have a similar denotation can be included in a specific translation cluster. Each translation cluster can include at least one distinct potential translation of the plurality of potential translations, and the one or more translation clusters can collectively include all of the plurality of potential translations. The technique can also include outputting, at the server, the one or more translation clusters.

In some embodiments, the first clustering algorithm can be defined as:

$$B \leftarrow \{C \cap T_s : C \in \cup_{t \in T_s} \mathcal{D}_t\}$$
$$\mathcal{G} \leftarrow \emptyset$$
for $B \in \mathcal{B}$ do
    if $\nexists B' \in \mathcal{B}$ such that $B \subset B'$ then
        add $B$ to $\mathcal{G}$
return $\mathcal{G}$ where $T_S$ represents the plurality of potential translations, C represents a synonym set including a set of target-language words, $\mathcal{D}$ represents a set of synonym sets in which a specific potential translation t appears, B represents a source-specific synonym set, which is a subset of $T_S$, $\mathcal{B}$ represents a set of source-specific synonym sets, and G represents the one or more translation clusters for $T_S$.

In other embodiments, determining the one or more synonyms for each the one or more potential translations can include applying a second clustering algorithm over a portion of the target language using one or more corpora.

In some embodiments, the second clustering algorithm can be a K-means clustering algorithm, K being approximately 1000.

In other embodiments, the one or more translation clusters are not determined based on context.

In some embodiments, determining the one or more synonyms for each of the one or more potential translations can include receiving, at the server, the synonyms from a predetermined datastore in response to a request, the predetermined datastore including one or more synonyms for each of a plurality of words in the target language.

In other embodiments, the technique can further include associating, at the server, a usage example with each of the one or more translation clusters, and outputting, at the server, the one or more usage examples with the one or more translation clusters.

In some embodiments, the technique can further include determining, at the server, the one or more usage examples for the one or more translation clusters, respectively, by extracting phrase pairs using a parallel corpus.

In other embodiments, the source word can be input by a user at a computing device and transmitted from the computing device to the server via a network.

In some embodiments, outputting the one or more translation clusters at the server can include transmitting, from the server, the one or more translation clusters to the computing device via the network for display to the user at the computing device.

A server is also presented. The server can include a communication device and one or more processors. The communication device can be configured to receive a source word in a source language. The one or more processors can be configured to determine one or more potential translations for the source word in a target language different than the source language. The one or more processors can be configured to determine one or more synonyms for each of the one or more potential translations to obtain a plurality of potential translations. The one or more processors can also be configured to determine one or more translation clusters using the plurality of potential translations and a first clustering algorithm. Each translation cluster can contain all of the plurality of potential translations that have a similar denotation and each of the plurality of translations that have a similar denotation can be included in a specific translation cluster. Each translation cluster can include at least one distinct potential translation of the plurality of potential translations, and the one or more translation clusters can collectively include all of the plurality of potential translations. The communication device can also be configured to output the one or more translation clusters.

In some embodiments, the first clustering algorithm can be defined as:

$$\mathcal{B} \leftarrow \{C \cap T_s : C \in \cup_{t \in T_s} \mathcal{D}_t\}$$
$$\mathcal{G} \leftarrow \emptyset$$
$$\text{for } \mathcal{B} \in \mathcal{B} \text{ do}$$
$$\quad \text{if } \nexists \mathcal{B}' \in \mathcal{B} \text{ such that } \mathcal{B} \subset \mathcal{B}' \text{ then}$$
$$\quad\quad \text{add } \mathcal{B} \text{ to } \mathcal{G}$$
$$\text{return } \mathcal{G}$$

where $T_S$ represents the plurality of potential translations, C represents a synonym set including a set of target-language words, $\mathcal{D}$ represents a set of synonym sets in which a specific potential translation t appears, B represents a source-specific synonym set, which is a subset of $T_S$, $\beta$ represents a set of source-specific synonym sets, and G represents the one or more translation clusters for $T_S$.

In other embodiments, the one or more processors can be configured to determine the one or more synonyms for each the one or more potential translations by applying a second clustering algorithm over a portion of the target language using one or more corpora.

In some embodiments, the second clustering algorithm can be a K-means clustering algorithm, K being approximately 1000.

In other embodiments, the one or more translation clusters are not determined based on context.

In some embodiments, the one or more processors can be configured to determine the one or more synonyms for each of the one or more potential translations by receiving, via the communication device, the synonyms from a predetermined datastore in response to a request, the predetermined datastore including one or more synonyms for each of a plurality of words in the target language.

In other embodiments, the one or more processors can be further configured to associate a usage example with each of the one or more translation clusters, and the communication device can be further configured to output the one or more usage examples with the one or more translation clusters.

In some embodiments, the one or more processors can be further configured to determine the one or more usage examples for the one or more translation clusters, respectively, by extracting phrase pairs using a parallel corpus.

In other embodiments, the source word can be input by a user at a computing device and transmitted from the computing device to the server via a network.

In some embodiments, the communication device can be configured to output the one or more translation clusters by transmitting the one or more translation clusters to the computing device via the network for display to the user at the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Bilingual dictionaries are typically created by one or more human lexicographers, which can be both costly and time consuming. In addition, machine translation may be based on context of a word or words. Accordingly, techniques are presented for generating translation clusters. The techniques include machine translation and clustering, which can be faster and less expensive than manual generation by one or more human lexicographers. Further, the techniques can automatically generate translation clusters without using context. The techniques generally provide for a more useful and user-friendly presentation of potential translations of a word from a source language to a different target language by arranging the potential translations into clusters. The techniques are further described in the paper attached hereto entitled "Unsupervised Translation Sense Clustering," which is incorporated by reference in its entirety.

Figure 1:
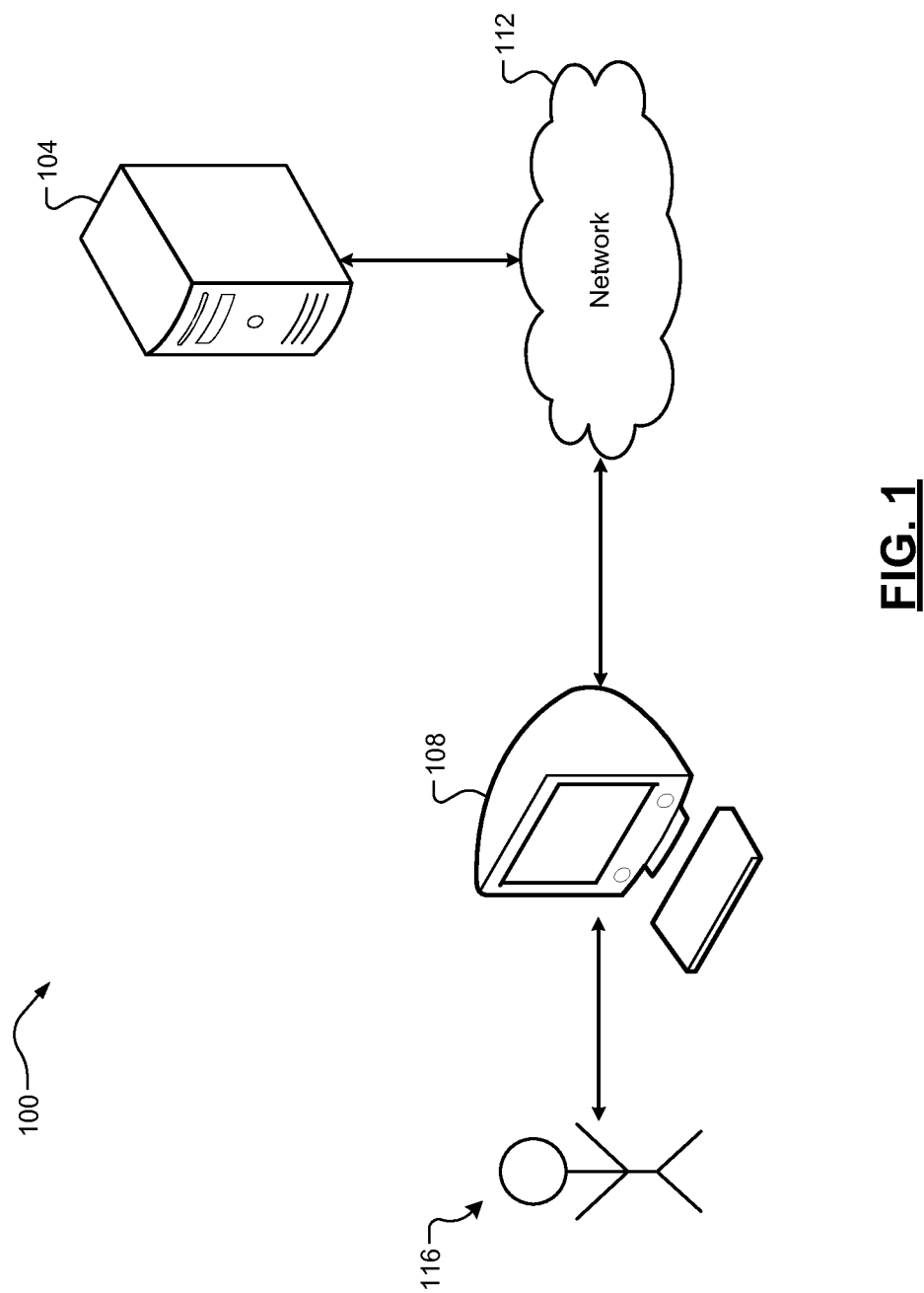
FIG. 1 is a diagram of an example computing network including a server according to some implementations of the present disclosure.

Referring now to FIG. 1, an example computing network 100 is illustrated. The computing network 100 can include a server 104 including one or more processors. The server 104 can be configured according to some implementations of the present disclosure. While one server 104 is shown, it should be appreciated that a plurality of servers can be implemented operating in a parallel or distributed architecture. The computing network 100 can also include a computing device 108 (a desktop computer, a laptop computer, a tablet computer, a mobile phone, etc.). The server 104 can be configured for communication with the computing device 108 via a network 112. The network 112 can include a local area network (LAN), a wide area network (WAN), e.g., the Internet, or a combination thereof. The computing device 108 can display information to and/or receive input from a user 116.

Specifically, the user 116 can input a source word in a source language at the computing device 108. In response to a request, e.g., from the user 116, to translate the source word to a target language that is different than the source language, the computing device 108 can transmit the source word to the server 104 via the network 112. In response to receiving the source word, the server 104 can generate one or more translation clusters according to the techniques of the present disclosure (described in detail below). After generating the one or more translation clusters, the server 104 can output the one or more translation clusters. For example, the server 104 can transmit the one or more translation clusters to the computing device 108 via the network 112, and the computing device 108 can display the one or more translation clusters to the user 116.

Figure 2:
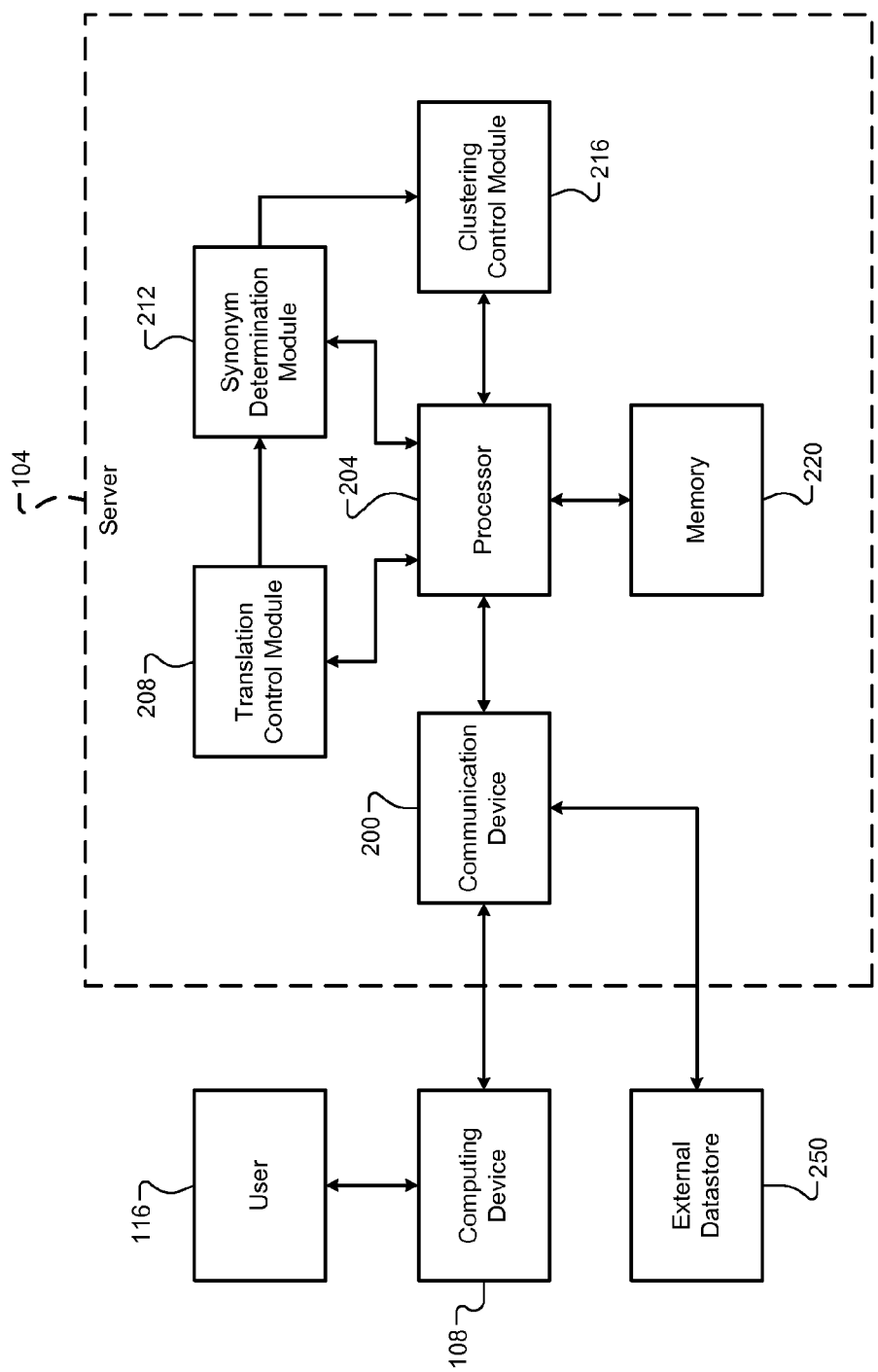
FIG. 2 is a functional block diagram of the server of FIG. 1.

Referring now to FIG. 2, a functional block diagram of the server 104 is illustrated. The server 104 can be any suitable computing device including a communication device 200, a processor 204, a translation control module 208, a synonym determination module 212, and a clustering control module 216. It should be appreciated that while one processor 204 is shown, the use of the term "processor 204" herein includes a single processor the server 104 as well as two or more processors operating in a parallel or distributed architecture. The server 104 can also include other suitable components, such as memory 220. The processor 204 can wholly or partially execute the various modules of the server 104.

The communication device 200 can be configured for communication between the computing device 108 and the server 104 via the network 112. Specifically, the communication device 200 can receive the source word in the source language from the computing device 108 via the network 112, and the communication device 200 can transmit the one or more translation clusters to the computing device 108 via the network 112. The communication device 200, therefore, can include any suitable components used for communication via the network 112, such as a transceiver. The communication device 200 can be configured for communication via one or more communication mediums, such as wireless (e.g., radio frequency or satellite) communication and/or wired (e.g., Ethernet) communication. It should be appreciated, however, that the communication device 200 can be configured for communication via other suitable communication mediums.

The processor 204 can communicate with and/or control the communication device 200, the translation control module 208, the synonym determination module 212, the clustering control module 216, and the memory 220. As previously described, the processor 204 can wholly or partially execute the various modules of the computing device 108. Specifically, the processor 204 (or processors) can wholly or partially execute the translation control module 208, the synonym determination module 212, and the clustering control module 216. The processor 204 can also control other functions of the computing device 108 including, but not limited to, loading and executing an operating system, controlling communication by the communication device 200 via the network 112, and controlling various operations relating to the memory 220 (storing, searching, retrieving, deleting, etc.). The memory 220 can be any suitable storage medium capable of storing data, searching the data, and deleting the data. For example only, the memory 220 can be non-volatile memory.

The translation control module 208 can determine one or more potential translations for the source word. Each of the potential translations can be in the target language, which is different than the source language. For example, the source language may be Spanish and the target language may be English. The translation control module 208 can determine the one or more potential translations using suitable machine translation techniques. For example, the translation control module 208 may use a language model and/or a translation model in obtaining the one or more potential translations from the source word.

The synonym determination module 212 can determine one or more synonyms for each of the one or more potential translations to obtain a plurality of potential translations. Rather, the plurality of potential translations can include the one or more potential translations and their various synonyms. The synonym determination module 212 can receive the one or more potential translations from the translation control module 208 (or via the processor 204). The synonym determination module 212 can retrieve the synonyms from an external datastore 250. For example, the external datastore 250 can be accessed via the network 112 using the communication device 200. While an external datastore 250 is shown and described herein, it should be appreciated that an internal datastore could also be used. The external datastore 250 can include one or more synonyms for each of a plurality of words in the target language. For example, the external datastore 250 can include all of the synonyms for all of the words in the target language. The synonyms can also be divided into sets. These sets of synonyms can also be referred to as "synsets." For example, each of the synonyms in a set can have a similar denotation.

Alternatively, the synonym determination module 212 can determine the synonyms itself. The synonym determination module 212 can determine the synonyms for each of the one or more potential translations by applying a clustering algorithm over a portion of the target language using one or more corpora. Specifically, the synonym determination module 212 can determine the synonyms based on usage statistics in the one or more corpora. For example, the one or more corpora can include large monolingual corpora and/or large parallel corpora. This clustering algorithm can be distinct from a clustering algorithm used to determine the one or more translation clusters (a first clustering algorithm, described in detail below) and can therefore be referred to as a second clustering algorithm. The second clustering algorithm can be a K-means clustering algorithm. It should be appreciated, however, that other suitable clustering algorithms can be used. For example, K may be approximately 1000. The selection of K≈1000 may indicate a minimum value of K that produces a desired level of accuracy without unnecessary additional processing. In other words, a value of K=2000 may produce similar accuracy as a value of K=1000, while being more computationally intensive.

The clustering control module 216 can determine the one or more translation clusters using the plurality of potential translations and the first clustering algorithm. The clustering control module 216 can receive the plurality of potential translations from the synonym determination module 212 (or via the processor 204). Each translation cluster can contain all of the plurality of potential translations that have a similar denotation and each of the plurality of translations that have a similar denotation can be included in a specific translation cluster. Each translation cluster can include at least one distinct potential translation of the plurality of potential translations, and the one or more translation clusters can collectively include all of the plurality of potential translations. In other words, the determination of which translation clusters are the correct translation clusters to obtain the one or more translation clusters can be described as being based on the following properties.

First, the determination does not enumerate all denotations of the source word. Rather, denotation distinctions may be made in situations when they affect cross-lingual lexical choice. For example, if a source words has a plurality of denotations but translates the same way regardless of the denotation, then there may be a single appropriate translation cluster. Second, none of the one or more translation clusters should be a superset of another. This criterion of "completeness" encourages larger translation clusters that are easier to interpret, because their unifying denotations can be identified as the intersection of denotations of the translations in the translation cluster. Lastly, the one or more translation clusters do not need to form a partition of the source word translations. Rather, a potential translation can appear in more than one of the one or more translation clusters.

The first clustering algorithm can be defined as follows:

$$\mathcal{B} \leftarrow \{C \cap T_s : C \in \cup_{t \in T_s} T_t\}$$
$$\mathcal{G} \leftarrow \emptyset$$
$$\text{for } \mathcal{B} \in \mathcal{B} \text{ do}$$
$$\quad \text{if } \nexists \mathcal{B}' \in \mathcal{B} \text{ such that } \mathcal{B} \subset \mathcal{B}' \text{ then}$$
$$\quad\quad \text{add } \mathcal{B} \text{ to } \mathcal{G}$$
$$\text{return } \mathcal{G}$$

where $T_S$ represents the plurality of potential translations, C represents a synset including a set of target-language words, D represents a set of synsets in which a specific potential translation t appears, B represents a source-specific synset, which is a subset of $T_S$, β represents a set of source-specific synsets, and G represents the one or more translation clusters for $T_S$. It should be appreciated, however, that other suitable clustering algorithms can be used.

After determining the one or more translation clusters, the server 104 can associate a usage example with each translation cluster. The usage examples can be predetermined and can be retrieved by the server 104, e.g., from the external datastore 250. Alternatively, the server 104 can generate the usage examples itself. For example, the server 104 can determine the usage examples by extracting phrase pairs using a parallel corpus. The server 104 can then output the one or more translation clusters (and, if applicable, the one or more usage examples). For example, the server 104 can transmit this information to the computing device 108 via the network 112, and the computing device 108 can display the information to the user 116. In some implementations, this process could be repeated for some or all the words of the source language to automatically generate a bilingual dictionary or a bilingual thesaurus.

For example only, the source word "colocar" in Spanish can be input to the server 104. The server 104 can generate the following translation clusters and usage examples for the source word "colocar" in the English language:

| Translation Cluster | Denotation Description | Usage Example |
|---|---|---|
| collocate | group or chunk together in a certain order or place side by side | colocar juntas todas los libros collocate all the books |
| invest, place, put | make an investment | capitales para colocar capital to invest |
| locate, place | assign a location to | colocar el número de serie locate the serial number |
| place, position, put | put into a certain place or abstract location | colocar en un lugar put in a place |

For example, this layout of the translation clusters, the denotation descriptions, and the usage examples could be displayed to the user 116 at the computing device 108.

Figure 3:
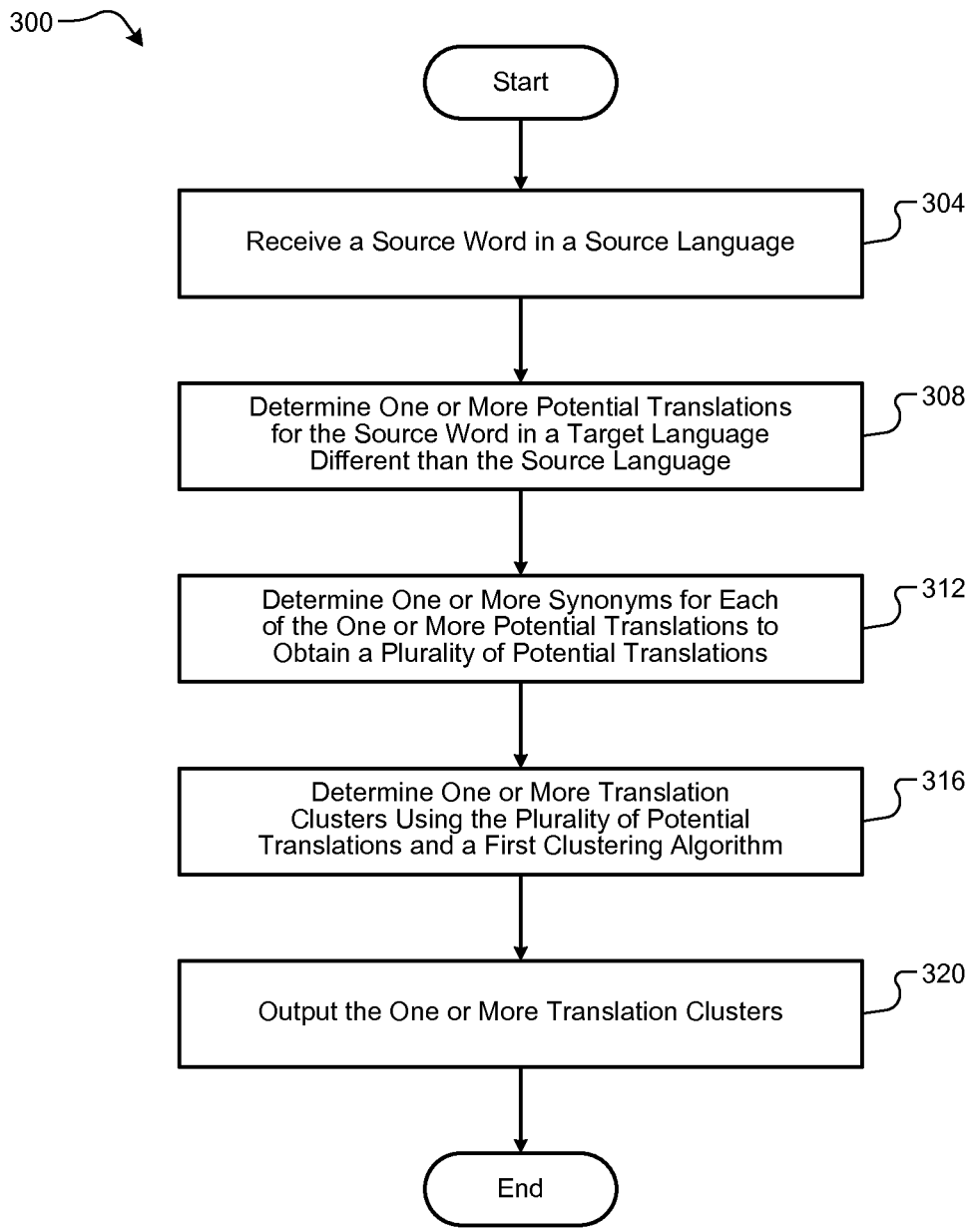
FIG. 3 is a flow diagram of an example technique for generating translation clusters according to some implementations of the present disclosure.

Referring now to FIG. 3, an example technique 300 for generating translation clusters is illustrated. The technique 300 begins at 304. At 304, the server 104 can receive a source word in a source language. At 308, the server 104 can determine one or more potential translations for the source word in a target language different than the source language. At 312, the server 104 can determine one or more synonyms for each of the one or more potential translations to obtain a plurality of potential translations. At 316, the server 104 can determine one or more translation clusters using the plurality of potential translations and a first clustering algorithm. Each translation cluster can contain all of the plurality of potential translations that have a similar denotation and each of the plurality of translations that have a similar denotation can be included in a specific translation cluster. Each translation cluster can include at least one distinct potential translation of the plurality of potential translations, and the one or more translation clusters can collectively include all of the plurality of potential translations. At 320, the server 104 can output the one or more translation clusters.

The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a server from a computing device via a network, the server including one or more processors, a single source word in a source language, wherein the single source word is input by a user at the computing device;
determining, at the server, one or more potential translations for the single source word in a target language different than the source language;
determining, at the server, one or more synonyms for each of the one or more potential translations to obtain a plurality of potential translations, wherein the synonyms are stored in a datastore, and wherein the datastore can be accessed via a network;
generating, at the server, one or more translation clusters using the plurality of potential translations and a first clustering algorithm and without using a context of the single source word, each translation cluster containing all of the plurality of potential translations that have a similar denotation each of the plurality of potential translations that have a similar denotation are included in a specific translation cluster, each translation cluster including at least one distinct potential translation of the plurality of potential translations, the one or more translation clusters collectively including all of the plurality of potential translations; and
outputting, from the server to the computing device via the network, information based on the one or more translation clusters,
wherein the first clustering algorithm is defined as:

$$B \leftarrow \{C \cap T_s : C \in \cup_{t \in T_s} \mathcal{D}_t\}$$
$$\mathcal{G} \leftarrow \emptyset$$
$$\text{for } B \in \mathcal{B} \text{ do}$$
$$\quad \text{if } \nexists B' \in \mathcal{B} \text{ such that } B \subset B' \text{ then}$$
$$\quad\quad \text{add } B \text{ to } \mathcal{G}$$
$$\text{return } \mathcal{G}$$

where $T_S$ represents the plurality of potential translations, C represents a synonym set including a set of target-language words, $\mathcal{D}_t$ represents a set of synonym sets in which a specific potential translation t appears, B represents a source-specific synonym set, which is a subset of $T_S$, $\mathcal{B}$ represents a set of source-specific synonym sets, and $\mathcal{G}$ represents the one or more translation clusters for $T_S$.

2. The computer-implemented method of claim 1, wherein determining the one or more synonyms for each the one or more potential translations includes applying a second clustering algorithm over a portion of the target language using one or more corpora.

3. The computer-implemented method of claim 2, wherein the second clustering algorithm is a K-means clustering algorithm, K being approximately 1000.

4. The computer-implemented method of claim 1, wherein determining the one or more synonyms for each of the one or more potential translations includes receiving, at the server, the synonyms from a predetermined datastore in response to a request, the predetermined datastore including one or more synonyms for each of a plurality of words in the target language.

5. The computer-implemented method of claim 1, further comprising associating, at the server, a usage example with each of the one or more translation clusters, wherein the information includes the one or more usage examples.

6. The computer-implemented method of claim 5, further comprising determining, at the server, the one or more usage examples for the one or more translation clusters, respectively, by extracting phrase pairs using a parallel corpus.

7. The computer-implemented method of claim 6, further comprising generating, by the server, a source-target language bilingual dictionary using the one or more translation clusters and the one or more usage examples.

8. The computer-implemented method of claim 7, wherein the information includes the source-target language bilingual dictionary.

9. The computer-implemented method of claim 1, wherein the information includes the one or more translation clusters.

10. A server comprising:
a communication device configured to receive, from a computing device via a network, a single source word in a source language, wherein the single source word is input by a user at the computing device; and
one or more processors configured to:
   determine one or more potential translations for the single source word in a target language different than the source language,
   determine one or more synonyms for each of the one or more potential translations to obtain a plurality of potential translations, wherein the synonyms are stored in a datastore, and wherein the datastore can be accessed via a network, and
   generate one or more translation clusters using the plurality of potential translations and a first clustering algorithm and without using a context of the single source word, each translation cluster containing all of the plurality of potential translations that have a similar denotation each of the plurality of potential translations that have a similar denotation are included in a specific translation cluster, each translation cluster including at least one distinct potential translation of the plurality of potential translations, and the one or more translation clusters collectively including all of the plurality of potential translations, wherein the communication device is also configured to output, to the computing device via the network, information based on the one or more translation clusters, wherein the first clustering algorithm is defined as:

$$\begin{aligned}
&\mathcal{B} \leftarrow \{C \cap T_s : C \in \cup_{t \in T_s} \mathcal{D}_t\} \\
&\mathcal{G} \leftarrow \emptyset \\
&\text{for } \mathcal{B} \in \mathcal{B} \text{ do} \\
&\quad \text{if } \nexists \mathcal{B}' \in \mathcal{B} \text{ such that } \mathcal{B} \subset \mathcal{B}' \text{ then} \\
&\quad\quad \text{add } \mathcal{B} \text{ to } \mathcal{G} \\
&\text{return } \mathcal{G}
\end{aligned}$$

where $T_S$ represents the plurality of potential translations, C represents a synonym set including a set of target-language words, $\mathcal{D}_t$ represents a set of synonym sets in which a specific potential translation t appears, B represents a source-specific synonym set, which is a subset of $T_S$, $\mathcal{B}$ represents a set of source-specific synonym sets, and $\mathcal{G}$ represents the one or more translation clusters for $T_S$.

11. The server of claim 10, the one or more processors are configured to determine the one or more synonyms for each the one or more potential translations by applying a second clustering algorithm over a portion of the target language using one or more corpora.

12. The server of claim 11, wherein the second clustering algorithm is a K-means clustering algorithm, K being approximately 1000.

13. The server of claim 10, wherein the one or more processors are configured to determine the one or more synonyms for each of the one or more potential translations by receiving, via the communication device, the synonyms from a predetermined datastore in response to a request, the predetermined datastore including one or more synonyms for each of a plurality of words in the target language.

14. The server of claim 10, wherein the one or more processors are further configured to associate a usage example with each of the one or more translation clusters, and wherein the information includes the one or more usage examples.

15. The server of claim 14, wherein the one or more processors are further configured to determine the one or more usage examples for the one or more translation clusters, respectively, by extracting phrase pairs using a parallel corpus.

16. The server of claim 15, wherein the operations further comprise generating a source-target language bilingual dictionary using the one or more translation clusters and the one or more usage examples.

17. The server of claim 16, wherein the information includes the source-target language bilingual dictionary.

18. The server of claim 10, wherein the information includes the one or more translation clusters.

* * * * *